Sept. 1, 1936. V. DURBIN 2,052,999
PAGING SYSTEM
Filed July 13, 1932 6 Sheets-Sheet 1

Sept. 1, 1936.　　　　　V. DURBIN　　　　　2,052,999
PAGING SYSTEM
Filed July 13, 1932　　　　6 Sheets-Sheet 2

Witness
H. Van Dine

Inventor
Verein Durbin
by his attorneys
Van Buren Fish
Mildred Cary

Sept. 1, 1936.       V. DURBIN       2,052,999
PAGING SYSTEM
Filed July 13, 1932       6 Sheets-Sheet 4

Fig. 5

Witness
H. Van Dine

Inventor
Vernon Durbin
by his attorneys
Van Esbrea Fish
Hildreth & Cary

Sept. 1, 1936.                    V. DURBIN                    2,052,999
                                PAGING SYSTEM
                            Filed July 13, 1932           6 Sheets-Sheet 5

Sept. 1, 1936.  V. DURBIN  2,052,999
PAGING SYSTEM
Filed July 13, 1932  6 Sheets-Sheet 6

Fig. 9

Patented Sept. 1, 1936

2,052,999

UNITED STATES PATENT OFFICE 2,052,999

PAGING SYSTEM

Vernon Durbin, Newton, Mass., assignor to The Holtzer-Cabot Electric Company, Roxbury, Mass., a corporation of Massachusetts Application July 13, 1932, Serial No. 622,231

13 Claims. (Cl. 177—353)

The present invention relates to paging systems and more particularly to paging systems of the flashing and successive type in which a plurality of calls are set up on independent banks on a call board and are flashed in succession on an annunciator. The operations of setting up and flashing the calls are in general similar to those described in the Baker Patent No. 1,795,536.

An object of this invention is to provide improvements in the Baker construction, particularly with relation to simplicity and reliability.

Another object of the invention is to provide a flashing and successive type of paging system having provision for operating the apparatus rapidly over an inactive bank.

The flashing and successive type of system, as described in the Baker patent, employs a call board having a plurality of banks of switches, together with a flasher unit for successively associating the several banks of switches with the annunciator. According to the particular construction shown in the Baker patent, corresponding flasher and call switches are arranged in series and are associated with the annunciator through electrical relays. The avoidance of electrically operated circuit controlling relays is one of the objects of the present invention. Such relays undergo considerable wear, presumably due to the fluttering of the contacts at the time of closure. Moreover, they are a source of noise which is particularly objectionable in a hospital paging system.

According to the present invention, the flasher unit comprises a set of contacts adapted to be individually preset in accordance with the operation of the call board switches, together with means for successively operating the banks of flasher switches to open and close such of them as are preset by the operator. The direct circuit control to the annunciator is afforded from the intermittently operated flasher contacts which may be made sufficiently rugged to withstand the full current.

Another feature of the invention contemplates the use of a bank control for the flasher contacts whereby initiation of the signal is permitted to occur only at a definite time at the beginning of the cycle. This feature is particularly advantageous in that it prevents starting or cutting off of an incomplete signal.

Another feature of the invention contemplates the provision of means whereby the flasher contacts serve merely to establish an annunciator circuit and a special set of contacts are used to perform the actual service of opening and closing the circuits. Accordingly, such electrical service as is imposed on the contacts is localized on a relatively few contacts which may be easily replaced. The flasher contacts which are necessarily large in number, are therefore required to withstand only a negligible mechanical wear.

A still further feature of the invention contemplates the provision of means useful in any flasher or successive type of system for advancing the operation thereof rapidly over an inactive bank. In existing systems, employing, for example, three banks, a call on only one bank takes up less than one-third of the time of a complete cycle of operations. In order to avoid the dark period of more than two-thirds of a cycle, the invention contemplates the provision of means responsive to the absence of a signal on any bank for providing a rapid shift of the flasher to the next active bank. The value of this feature increases in proportion to the number of banks of the system, particularly when the system provides for dual character displays as with the use of letters and numbers.

Other features of the invention consist of certain novel features of construction, combinations and arrangement of parts hereinafter described and particularly defined in the claims.

In the accompanying drawings.

The invention is herein illustrated and described as embodied in a system of the "flashing and successive" type to give results similar to those of the construction of the Baker Patent No. 1,795,536. There is provided a plurality of annunciators, each of the type shown diagrammatically in Fig. 3, employing a plurality of lamps 20, each lamp having a characteristic symbol. As illustrated, each annunciator has ten lamps numbered consecutively from 1 to 0. Each annunciator is provided with a buzzer 22.

Figure 4:
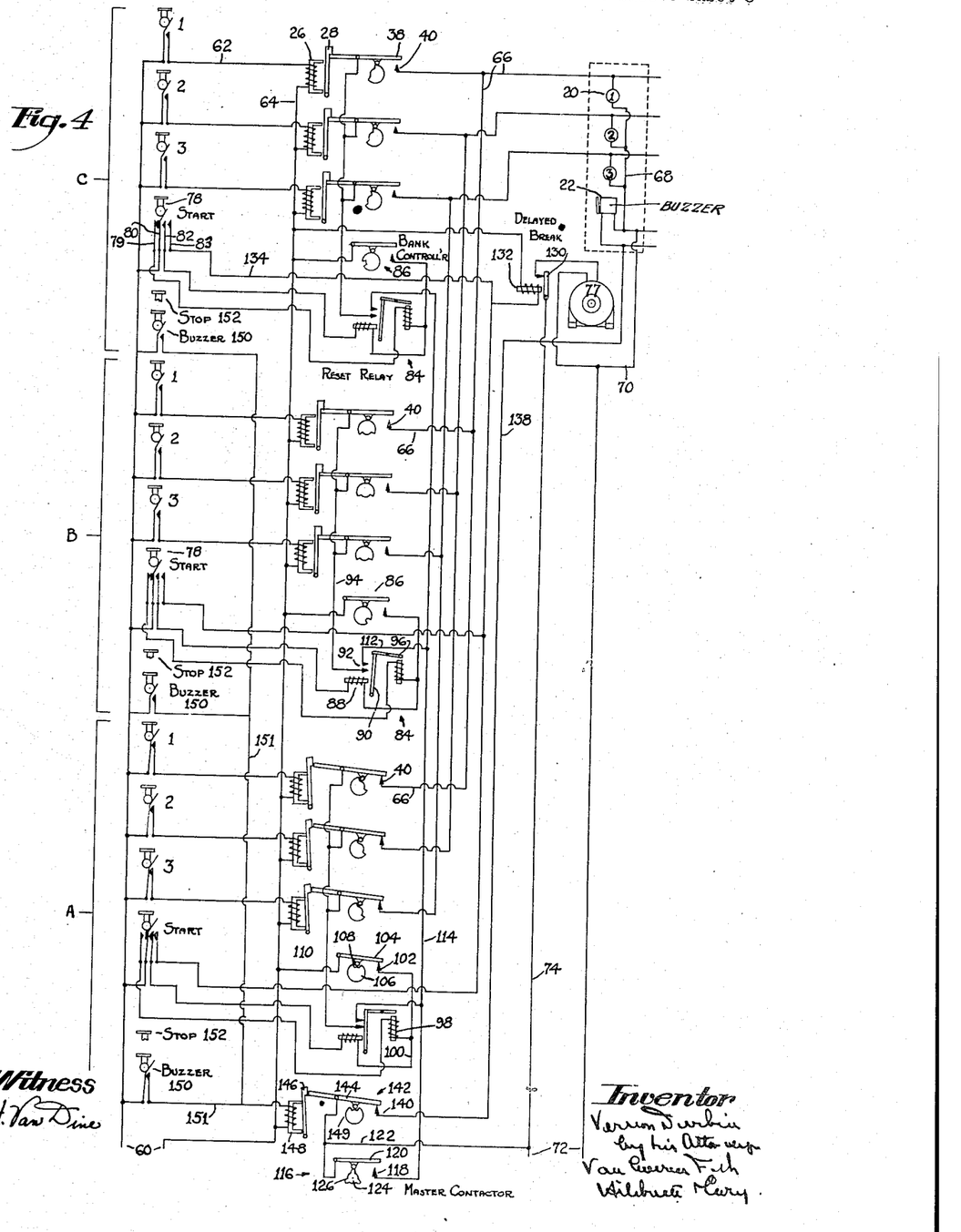
Fig. 4 is a diagram of the circuit connections.

As in the Baker construction, there is provided a call board having a plurality of banks of call switches, each bank having switches for the several annunciator lamps. In the diagram of Fig. 4, three banks of switches are illustrated at A, B and C. To avoid complication in this figure, only three switches are shown in each bank and three lamps in the annunciator. The annunciator may obviously comprise any number of lamps with any suitable characters, whether letters or numbers or any combination thereof, and there may be any number of banks of call switches, depending on the number of signals to be given in any cycle of operations. In the preferred mode of operation, each doctor is assigned a call number, preferably one consisting of three digits. The calls for several doctors may be set up on the separate banks of call switches. For example, doctor 123 may be set up on bank A, 467 on bank B, and 280 on bank C. In the operation of the system, banks A, B and C are successively or cyclically associated with the annunciator to display thereon the succession of characters set up on the several banks of switches at the call board. The invention is, however, not limited to the precise code described above, but may be employed to flash in succession a plurality of multiple character calls as set up on the individual banks of switches.

Figure 1:
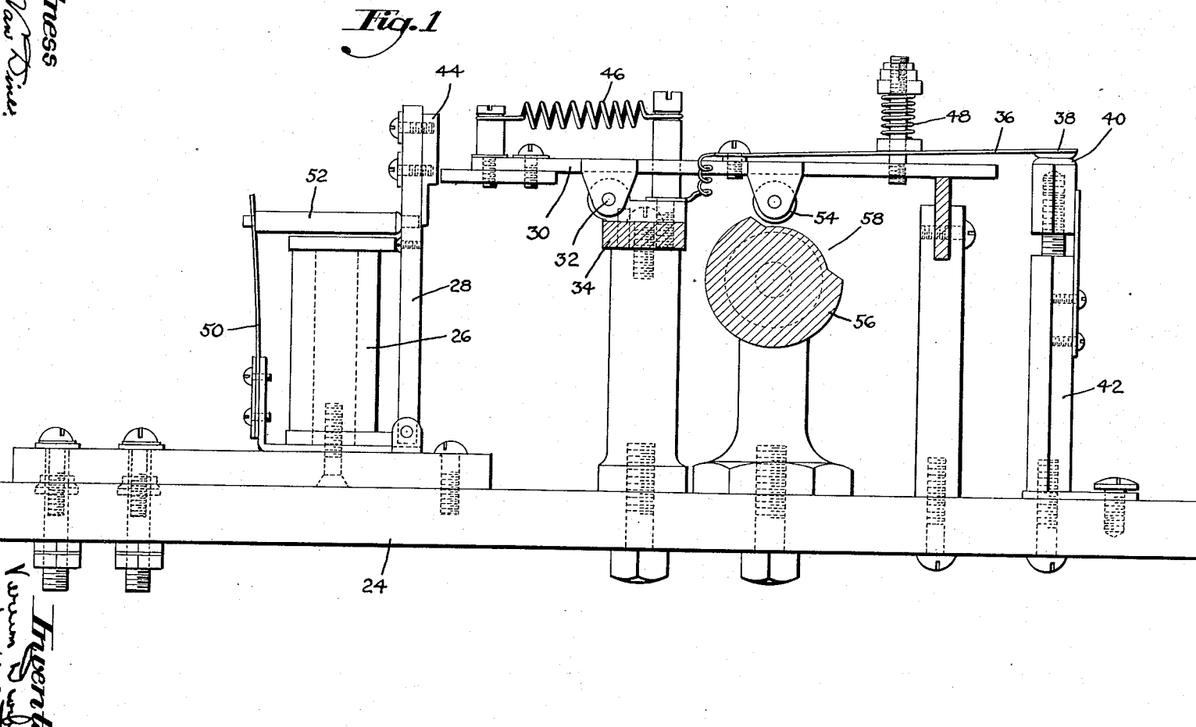
Fig. 1 is a side elevation partly in section of the preferred form of flasher unit.
Figures 2, 3:
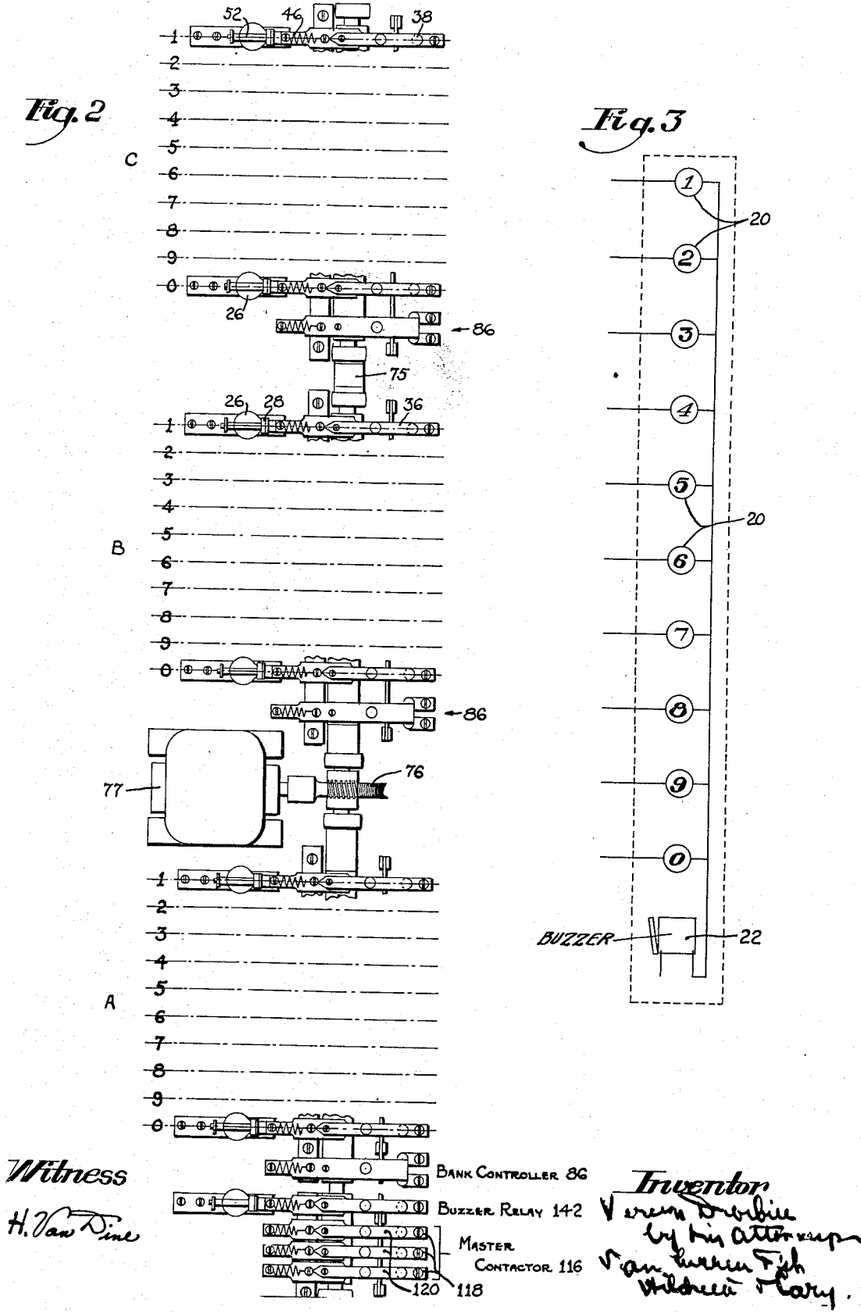
Fig. 2 is a plan view of the complete flasher.
Fig. 3 is a diagram of the annunciator.

The means for selectively associating the call switches with the annunciator are shown in Figs. 1 and 2 and diagrammatically illustrated in Fig. 4. For each call switch of each bank, there is provided a signal relay or contactor which, as shown in Fig. 1, comprises a base 24 on which is mounted an electromagnet 26 cooperating with a pivoted armature 28 which serves as a latching means for the horizontal movable contact arm 30. The contact arm 30 is pivoted at 32 on a standard 34 and carries at its outer end a contact spring 36. The contact spring has a movable contact 38 adapted to cooperate with a fixed contact 40 mounted on a post 42 on the base. The horizontal contact arm 30 is normally latched in open position by a projecting piece 44 secured to the armature 28. In the diagram of Fig. 4, the relays of banks B and C are shown in latched or inactive position and the relays of bank A are shown in unlatched or active position. The contact arm 30 is urged to a position to close contacts 38 and 40 by means of a spring 46. Mounted on the arm 30 is a coil spring assembly 48 which serves to press the upper movable contact 38 into firm engagement with the fixed contact 40 when the arm 30 is permitted to move toward circuit-closing position.

The armature 28 is urged toward its right-hand or latching position by a leaf spring 50 engaging with a spacer 52 which is attached to the armature.

The arm 30 carries a cam follower roll 54 adapted to be engaged by a rotating cam 56. The cam and follower are arranged so that when the arm 30 is in latched position, the follower 54 is maintained sufficiently high to prevent its dropping into the cam recess and thereby to prevent closure of the contacts, but when the arm is unlatched by attraction of the armature 28, the roll 54 is enabled to follow the configuration of the cam 56. The cam is recessed for slightly more than a third of a revolution, as indicated at 58.

As shown in Fig. 2, there is provided a signal relay for each call board switch, making thirty in all for a ten-signal three-bank system. Only a portion of the total number of relays are actually illustrated in Fig. 2, the positions of the remainder being indicated by the dot-and-dash lines. Considering the bank A of relays, each relay is identical with that shown in Fig. 1. The cam 56 extends in operative relation to all of the relays of the bank in such a manner that all of the unlatched contacts of the bank are caused to move in unison by the cam. The relays of banks B and C are constructed and arranged in identical fashion except that their cams are displaced by approximately 120° from one another. As shown in Fig. 4, the cam for the relays of bank A has come into a position to permit closure of the unlatched contacts of that bank for approximately one-third of a revolution, following which the cams for the relays of banks B and C come successively into operative positions.

The magnets 26 of all of the relays are connected in individual control circuits energized from a low tension line 60 through the individual signal keys and connecting wires 62 and 64. The contacts 38 and 40 of corresponding relays of the several banks are connected into individual annunciator circuits, for example, the fixed contacts 40 of all the No. 1 relays are connected by wires 66 which lead to the No. 1 lamp of the annunciator. All of the annunciator lamps are connected by a common lead 68 which connects with a wire 70 forming one side of a high tension line 72. The other wire 74 of the line connects through control apparatus (to be presently described in detail) with the movable contacts 38 of the individual signal relays.

The cams for the separate relay banks are coupled together, as indicated at 75, and are driven through worm gearing 76 by a motor 77. It will be seen that as the cams revolve, the contact arms 30 of the several banks of relays are successively rendered operative to move up and down under the influence of their respective cams, if unlatched by energization of their magnets 26 which are under the control of the call switches.

Associated with each bank of call switches is a start switch 78 which controls the connection of the line wire 74 with the movable contacts 38 of that bank. The start switch comprises a fixed contact 79 and a movable contact 80, the latter being adapted to remain closed on the contact 79 when the switch is in inactive position and to close on a relay controller contact 82 and a motor relay contact 83 when the switch is in active position. The start switch is shown in active or closed position for bank A and in inactive or open position for the banks B and C in Fig. 4.

The active signal relays of any bank are not energized directly from the line 72 but are placed under the control of a relay indicated generally at 84 and a bank controller indicated generally at 86. The relay 84, which may be termed a reset relay, comprises a magnet 88 in series with the contact 82 of the start switch of the corresponding bank. Cooperating with the magnet 88 is a pivoted armature 90 adapted when attracted by the magnet to bridge a pair of supervisory contacts 92, one of which is connected by a wire 94 with all of the movable contacts 38 of the signal relays of the bank. When the armature 90 is attracted, it is held in circuit-closing position by a latching armature 96 which is under the control of a release magnet 98 connected with the contact 79 of the start switch. Both the magnets 88 and 98 are connected by a wire 100 with a fixed contact 102 of the bank controller 86. The bank controller 86 has the fixed contact 102 and a movable contact arm 104 similar to the fixed and movable contacts of the signal relays. The cam 106 for actuating the bank controller is, however, formed with only a small recess 108 which acts to close its contacts only momentarily at the instant of initial closure of any active signal relays in the bank. The momentary closure of the bank controller contacts is illustrated for bank A in Fig. 4. The movable contact arm 104 is connected by a wire 110 with the wire 64 forming one side of the low tension line. It will be seen, therefore, that upon closure of the bank controller contacts, either the magnet 88 or the release magnet 98 will be energized, depending on whether the start switch is in active position, as illustrated for bank A, or in inactive position, as illustrated for banks B and C.

The supervisory contacts 92, which are adapted to be bridged by the armature 90, are connected into the annunciator circuits through the signal relays. The connection 94, leading from one of the contacts 92 to the movable signal relay contacts, has already been described. The other contact 92 is connected by a wire 112 with a connection 114 which leads to one side of the high tension line 72 through a master contactor, indicated generally at 116. The wire 114 is common to all of the reset relays of the several banks and forms the means for conducting current through an active reset relay and the active signal relays of any bank to the annunciator signals.

The master contactor 116 is of a form generally similar to the bank controllers in that it comprises a fixed contact 118 and a movable contact arm 120. The fixed contact 118 is connected to the wire 114 and the movable contact arm 120 is connected by a wire 122 with the line wire 72. The master contactor has a cam 124 formed with a plurality of recesses 126, each of which corresponds to the recesses 58 of the cams of the individual banks. The recesses 126 are, however, slightly shorter than the recesses 58 of the signal relay cams, so that the master contacts 118 and 120 close after the closure of any active signal relay contacts and open prior to the opening of the signal relay contact. In other words, the signal relay contacts merely establish a circuit to the selected annunciator signals, and the actual make and break of the current are localized at the master contactor. Accordingly, the signal relays are capable of practically indefinite use and the only necessity for repairs or replacements occurs at the master contacts.

As shown in Fig. 2, the master contactor preferably comprises a plurality of movable contact arms 120 associated with a similar number of fixed contacts 118. The several contacts (illustrated as three in Fig. 2) are connected in parallel for the purpose of distributing wear on the contacts.

The motor 77 is energized from the line 72 through relay contacts 130 controlled by a relay magnet 132 which is connected by a wire 134 with the motor relay contact 84 of the start switch 78. The motor relay is preferably of the delayed break type, of any suitable form, so constructed that upon opening of the start switch 78, the motor circuit is not immediately broken but is permitted to remain closed for at least one revolution of the cam shaft.

An audible signal, indicated as the buzzer 22, may be associated with each annunciator. The buzzer is connected at one side with the line 72 and is connected at the other side through a wire 138 to a fixed contact 140 of a buzzer relay, indicated at 142. The relay is in general similar to the signal relays in that it is provided with a movable contact arm 144, a latching armature 146 similar to the armature 28, and a magnet 148 similar to the magnet 26. The cam 149 may be provided with a recess to give any desired length of signal. The magnet 148 is controlled by a buzzer key 150 exactly similar to one of the call switches. There is provided one buzzer key for each bank, three in all. The three buzzer keys are connected in parallel to each other and in series with the magnet 148 by wires 151. Inasmuch as a single audible signal in a complete cycle is usually sufficient, the cam 149 has only a single short recess. The buzzer is operated in identical fashion whether one or all of the switches 150 are closed.

Associated with each bank of signal switches is a stop key 152 which is merely a mechanical release for all of the switches of the corresponding bank. The release mechanism may be similar to the construction described in the Baker patent.

In operation, any desired calls are set up on one or more banks of call switches. If an audible signal is desired, one of the buzzer switches of any active bank is closed. The start switch is then closed. This closes the motor relay contacts and starts the motor. At the same time, the reset relay magnet 88, corresponding to any active start switch, is placed in readiness to be energized when its circuit is completed through the closure of the bank controller contacts 102 and 104. Upon energization of the magnet 88, the supervisory contacts 92 are closed and are held closed by the latch armature 96 until the start switch for that bank is released. After closure of the supervisory contacts, the contacts 38 of the corresponding bank remain continuously energized and the signal relays are in readiness to close the annunciator circuit in accordance with the movement of the cam. The signals set up on the separate banks are therefore successively flashed at the annunciator. At the completion of a call, the stop key 152 is depressed to release the signal keys, as well as the start key of the corresponding bank. Thereafter, as soon as the relay controller contacts are energized by the action of the cam 106, the release magnet 98 of the reset relay is energized, thereby attracting the release armature 96 and permitting the main armature 90 to retract and thereby to open the contacts 92, thus restoring the apparatus to the original condition. Any single bank may be cleared by depressing the stop switch of that bank and any other active bank or banks will continue to function as above described.

It will be noted that through the use of the bank controller 86 of the reset relay 84, the supervisory contacts 92 cannot be closed or reopened except when the signal circuits are de-energized, and it is therefore impossible to display anything but a complete signal at the annunciator. A signal cannot be started until the supervisory contacts 92 are closed, following closure of the bank controller contacts 102 and 104, and if the start key is depressed at a time too late in the cycle for closure of the bank controller contacts, the signal will not be permitted to start until the next cycle. Similarly, the signal cannot be cut off until it is completed since the release magnet 98 is not energized until the bank controller cam 106 comes into operation. Moreover, de-energization of a signal relay magnet does not cut off an active signal, the circuit to the annunciator is maintained until the cam lifts the movable contact arm into position to be latched by the armature. It is for this reason that the motor relay is of the delayed break type to permit at least one complete rotation of the cam shaft to clear any signals that have been set up on the apparatus.

It will be seen that the system operates after the general manner of the Baker patent to flash a plurality of selected signals according to any desired code on the annunciator. The system, however, has a number of advantages over the Baker construction, principally in its simplicity and reliability. It will be seen that the system employs no electrical relays for making or breaking the signal circuits. It has been found that owing to the flutter of the contacts at the time of make or break, such contacts are subject to rapid pitting and mechanical wear. In the present invention, the contacts are smoothly opened and closed under the action of the cams and according to one of the features of the invention, all of the electrical duty is imposed on a few master contacts which can be easily replaced. Furthermore, the electrical signal relay is noisy in operation, particularly when a large number are being continually opened and closed as in a paging system. The signal contacts of the present invention operate practically without noise. The only relays that produce noise are the reset relays and the motor relay, which operate only at the start and finish of a signal.

Aside from the advantages above noted, the feature of the present invention by which only a complete signal can be transmitted regardless of the time of actuation of the switch is of the greatest value.

The invention also contemplates as an additional feature the provision of means for automatically advancing the flasher over a blank signal. For example, should it be desired to call only a single doctor on bank A, there being no calls on banks B and C, existing systems would display the call on the annunciator for only one-third of the time, the annunciator being dark for the remainder of the cycle. This may be disadvantageous when the system employs a large number of banks of call switches.

Figure 5:
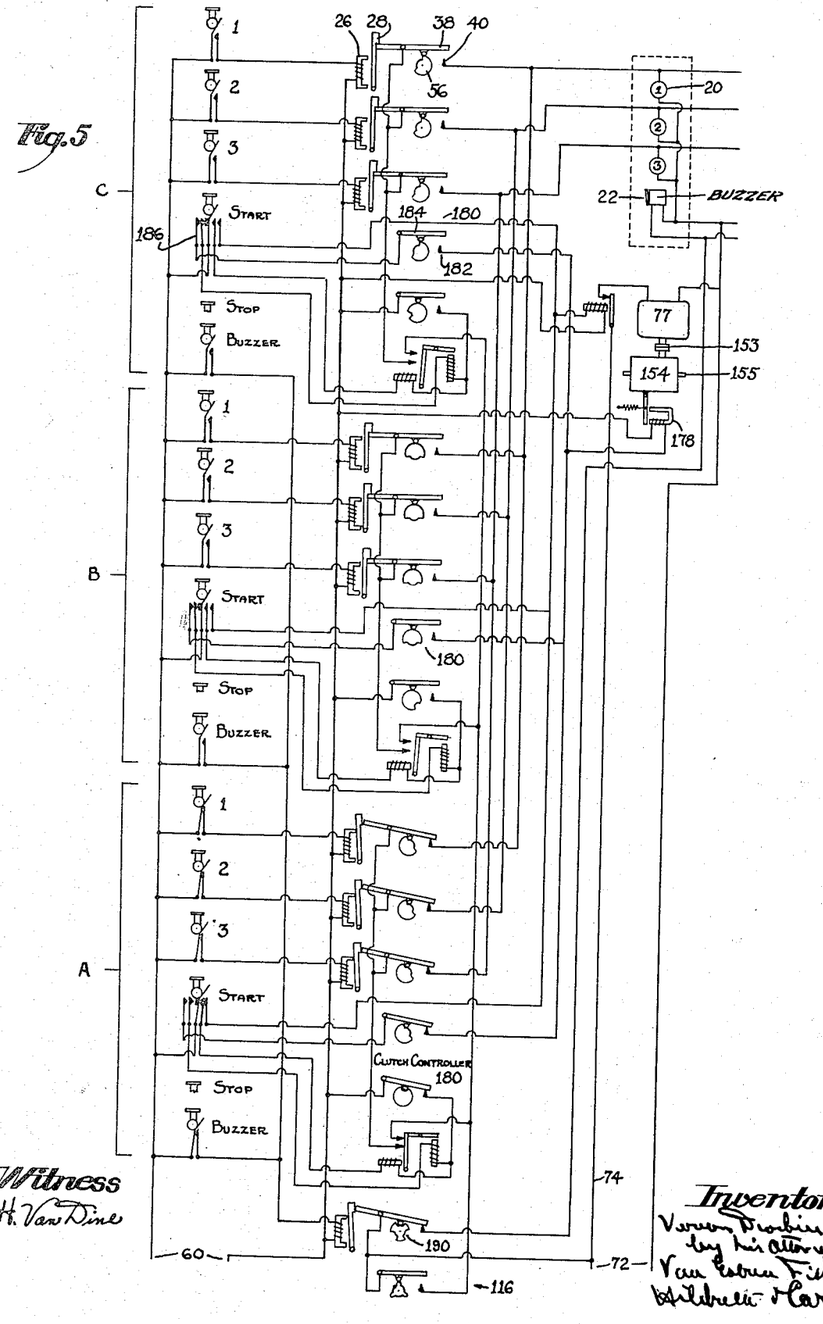
Fig. 5 is a diagram of the circuit connections of a modified form of the invention.
Figure 6:
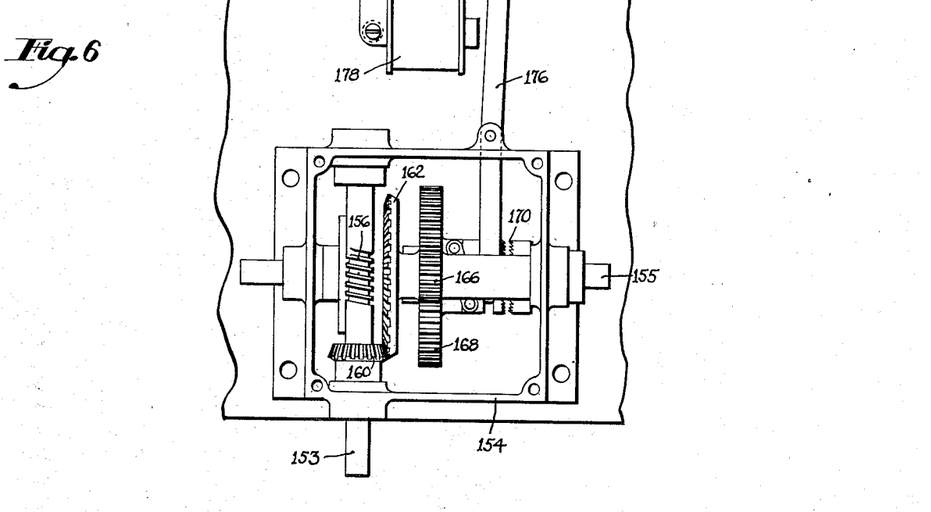
Fig. 6 is a plan view of the two-speed gear box.
Figure 7:
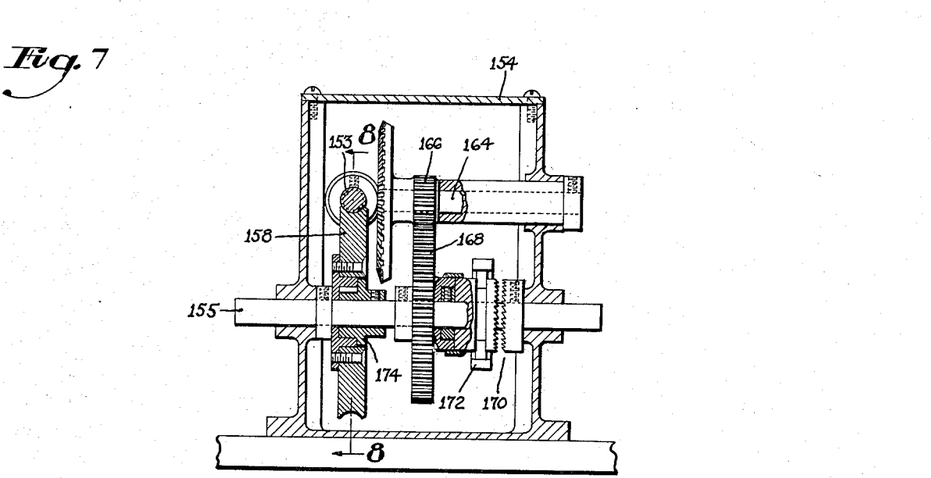
Fig. 7 is a sectional elevation of the gear box.
Figure 8:
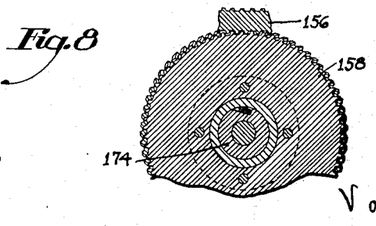
Fig. 8 is a section on line 8—8 of Fig. 7.

The system, according to the present invention for advancing the flasher rapidly over a blank signal, may be applied to any rotating flasher unit, but is illustrated in Figs. 5 to 8 as applied to a system of the type described above. The diagram of Fig. 5 is similar in most respects to that of Fig. 4, involving the three banks of call switches, the start switches, the signal relays, the master contactor, the motor 77, etc. The motor is adapted, however, to drive the cam shaft at either of two speeds, namely, a slow speed for normal display of the signal and a rapid speed for advancing the flasher quickly when no signal is set up on the corresponding bank. To this end, the motor shaft 153 is connected through a two-speed gear box 154 with the cam shaft 155. As shown in Figs. 6 to 8 inclusive, the motor shaft 153 normally drives the cam shaft 155 through a worm 156 and a worm wheel 158 similar to the worm gearing 76 of Fig. 2. The motor shaft also carries a small bevel gear 160 meshing with a bevel gear 162 on a jack shaft 164. A pinion 166 on the shaft 164 meshes with a gear 168 which is loosely mounted on the cam shaft 155. A two-part toothed clutch 170 is used to drive the cam shaft from the gear 168 and to this end, a movable yoke 172 is employed to move the two elements of the clutch into engagement. The worm wheel 158 is not attached directly to the cam shaft but transmits its rotation thereto through an overrunning clutch 174. An arm 176 forming part of the yoke 172 acts as an armature controlled by an electromagnet 178. The armature is normally held in the retracted position of Fig. 6 by any suitable spring. When the armature is attracted, the two clutch elements engage and drive the cam shaft at a speed considerably greater than that at which the shaft is normally driven through the worm gearing.

To each bank of signal relays there is added a clutch controller 180 having a fixed contact 182 and a movable contact 184, the contacts being controlled by a cam which is exactly similar in shape to the signal relay cams 58. The fixed contact 182 connects with one side of the gear control magnet 178, the other side of which is connected to one side of the low tension control line 60. The movable contact arm 184 is connected to an auxiliary contact 186 of the start switch 76, the contact 186 being closed when the switch is in inactive or open position, as shown for banks B and C.

It will be seen that when the start switch is in active position, as shown for bank A, the circuit for the clutch control magnet 178 is opened at the start switch and the clutch controller 180 is of no effect. In the diagram as shown in Fig. 5, the active signals on bank A can therefore be displayed in normal fashion. Upon rotation of the cam shaft by one-third of a revolution, however, the clutch controller contacts 182 and 184 for bank B are closed and since the start switch for this bank is in inactive position, the circuit is completed to the magnet 178, thereby throwing in the high speed gearing and advancing the system quickly to the next position. For row C, as shown in Fig. 5, the same action occurs, the magnet 178 being energized through the start switch and the clutch controller for that bank, thereby advancing the cam shaft quickly to its position for controlling bank A. When bank A comes again into operation, the magnet is de-energized and the signals of that bank are again displayed in normal fashion. As a result, so long as only one bank is active, its signals are displayed almost continuously without long blank intervals. Should the start switch in either bank B or bank C now be depressed, the signals for that bank will be displayed in their normal sequence. Likewise, upon the cutting out of any active bank, any remaining active banks assume control and display their signals to the exclusion of the bank previously cut out.

The only other necessary change from the diagram of Fig. 4 is in the buzzer control. The buzzer cam is formed with three recesses 190, one for each bank, so that the buzzer may be permitted to operate at least once in each cycle, regardless of the number of banks in operation.

Aside from the feature of rapidly passing over an inactive bank, the arrangement of Fig. 5 presents the same advantages as that of Fig. 4, with respect to prevention of flashing an incomplete signal, and other features previously described.

Although the systems above mentioned have been described as employing number characters only, it is evident that any characters such as letters or a combination of letters and numbers may be used. In some types of systems, a combination character annunciator is preferred. For example, the annunciator may have a series of letters such as A, B and C and a series of numbers 1, 2, 3, etc. A flash of the characters A12 may then be interpreted as calling for doctors A1 and A2; in other words, each flash may be used as a plurality of calls. In such an instance, the feature of rapid advance over an inactive bank is of the greatest value. A modified system operating in this manner is illustrated in Fig. 9.

Figure 9:
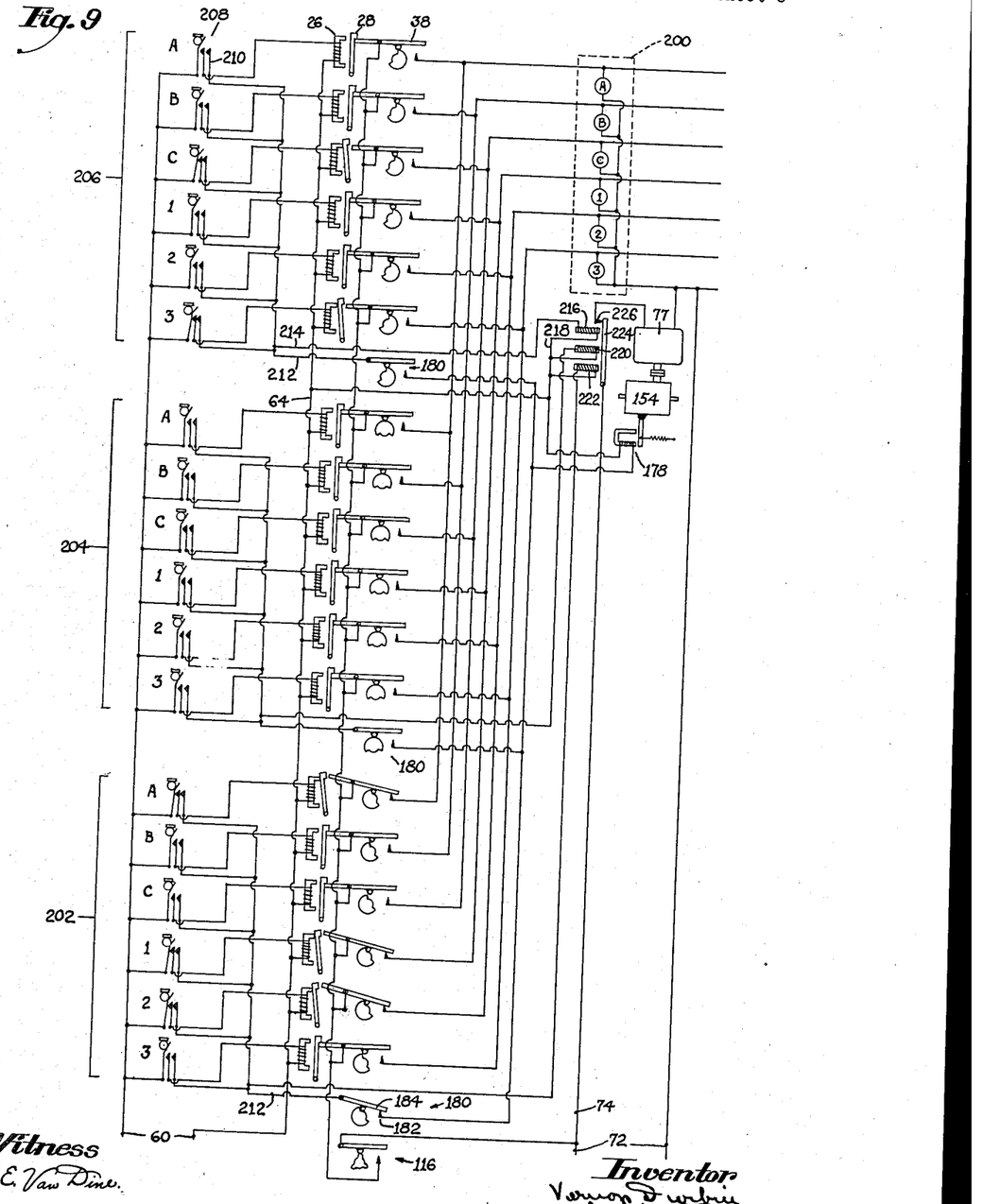
Fig. 9 is a diagram of another modified form of the invention.

In Fig. 9 is shown a three bank, six character system including an annunciator 200 having lamps with characters A, B, C, 1, 2, 3. There are provided three banks of call switches, indicated at 202, 204 and 206, each bank including switches 208 with characters A B, C, 1, 2 and 3. Since it may be necessary for the operator to set up new characters on a bank which is already active or to cut out characters from a bank while permitting continued flashing of the remainder, the start and stop keys are eliminated and the motor and clutch controls are placed under the direct operation of the calling keys themselves. Therefore, each switch 208 of the bank has in addition to the two contacts similar to those of the call switches previously described, an auxiliary contact 210 for controlling the operation of the motor and the clutch. The main contacts are connected as previously described directly to the signal relay magnets 26 and the signal relays are connected to the annunciator lamps. In this construction, as shown in Fig. 9, the bank controllers and the reset relays are eliminated and therefore the line connection 74 is connected through the master contactor directly to the movable contact arms of all of the signal relays.

Each bank of signal relays has a clutch controller 180 exactly similar to that shown in Fig. 5. The auxiliary contacts 210 of all of the switches of the bank are connected to a wire 212 which leads to the movable contact arm 184 of the clutch controller 180, the fixed contact 182 of which leads to the clutch magnet 178. All of the contacts 182 are connected together and to the clutch magnet. It will be noted that the clutch magnet is reversed from its position of Fig. 5. In other words, the arrangement is such that the cam shaft is driven at high speed when the clutch magnet 178 is de-energized and is driven at low speed when the clutch magnet is energized.

Starting and stopping of the motor are also controlled from the auxiliary contacts 210. Connected to the wire 212 is a wire 214 leading to a motor relay magnet 216, the other side of which is connected by a wire 218 with the common lead 64 which runs to the low tension line. There is provided one relay magnet for each bank illustrated as a magnet 220 for the bank 204 and a magnet 222 for bank 202. An armature 224 is adapted to be attracted by any of the relay magnets to close the motor circuit on a fixed contact 226. It will be seen, therefore, that actuation of any key immediately starts the motor which tends to operate the cam shaft at high speed so long as the clutch magnet 178 remains de-energized. As soon as one of the clutch controllers comes into active position, a circuit is completed through the auxiliary contact 210 of the depressed key and the clutch controller 180 to the clutch magnet 178, which then permits operation of the cam shaft at low speed. As the cam shaft comes into operation for any inactive bank, that is, any bank in which no call key is actuated, the clutch magnet 178 is de-energized, thereby permitting the cam shaft to operate at high speed over the inactive bank.

As shown in Fig. 9, switches A, 1 and 2 of bank 202 are closed, all switches of bank 204 are open, and switches C and 3 of bank 206 are closed. At the particular instant for which the diagram applies, characters A12 are being displayed on the annunciator, the cam shaft being driven at its low speed. After approximately one-third of a revolution of the cam shaft, the parts are placed in readiness for control by bank 204, but since there are no closed switches in this bank, the clutch controller circuit is open and the cam shaft is operated at high speed. The system is therefore placed almost immediately under the control of the next active bank 206, and the characters C3 are displayed on the annunciator for a normal period determined by a third of a revolution of the shaft at its low speed. Accordingly, the annunciator displays the signals A12 and C3 in succession. Should any switch or switches in bank 204 now be closed, a corresponding call would be set up on the annunciator at the proper time. The motor continues to operate so long as any switch in the entire system is closed and is automatically stopped when all calls are cleared from the board.

Having thus described the invention, what is claimed is:

1. Paging apparatus comprising an annunciator having a plurality of signals, a flasher having a plurality of banks of contacts, each signal being associated with corresponding contacts of the several banks, a plurality of banks of call switches, each having contacts associated with corresponding flasher contacts and auxiliary contacts, operating means for operating the flasher banks in succession at either of two speeds, means controlled by the auxiliary contacts of any bank for driving the operating means at low speed when any of said auxiliary contacts are closed and at high speeds when all of said auxiliary contacts are open.

2. Paging apparatus comprising an annunciator having a plurality of signals, a flasher having a plurality of banks of contacts, each signal being associated with corresponding contacts of the several banks, a plurality of banks of call switches, a start switch in each bank of call switches, means for successively operating the flasher banks including driving means for either high or low speed, and connections between the start switch and the driving means to operate the latter at high speed with respect to any bank for which the start switch is inactive.

3. Paging apparatus comprising an annunciator having a plurality of signals, a plurality of banks of flasher switches, each signal being associated with corresponding switches of the several banks, selector means for individual flasher switches of each bank, operating means for actuating active flasher switches and acting successively on the several banks of flasher switches, whereby each bank controls display of annunciator signals for a portion only of each complete cycle, means for driving the operating means at a normal rate of speed, and means controlled by an inactive bank for rapidly advancing the operating means with respect to said bank.

4. Paging apparatus comprising an annunciator having a plurality of signals, a flasher having a plurality of banks of switches, each signal being associated with corresponding switches of the several banks, a call unit having a plurality of banks of selector means associated with corresponding flasher switches, operating means for acting successively on the several banks of flasher switches, whereby each bank controls display of annunciator signals for a portion only of each complete cycle, means for actuating the operating means at a normal rate, and means controlled by an inactive bank for advancing the operating means at an increased rate when acting on said inactive bank.

5. Paging apparatus comprising an annunciator having a plurality of signals, a plurality of banks of flasher switches, each bank including flasher contacts for the several annunciator signals, each signal being associated with corresponding contacts of the several banks, means for cyclically actuating the contacts of the several banks, manual means operable to render any switch effective at any part of the cycle, supervisory contacts for each bank to control the flow of current to the flasher contacts and to prevent, when open, the operation of any signal by a switch of the corresponding bank, a bank controller for each bank to close the supervisory contacts of an active bank only at a predetermined time in the cycle, holding means for maintaining the supervisory contacts closed after closure thereof by the bank controller, means connected with the bank controller for releasing the holding means to open the supervisory contacts only at a predetermined time in the cycle, and means for preventing opening of any previously closed flasher contact before said predetermined time.

6. Paging apparatus comprising an annunciator having a plurality of signals, a plurality of banks of contactors, each bank having a plurality of contactors, one for each annunciator signal, connections from each signal to the corresponding contactors of the several banks, a call board having a plurality of banks of call switches corresponding in number to the contactors, means associated with each call switch and its corresponding contactor for pre-setting the latter, means for cyclically operating the contactors of the several banks having provision for simultaneously operating all pre-set contactors of an individual bank, starting contacts on the call board for each bank, supervisory contacts for each bank in series with all contactors of its corresponding bank, a bank controller operating only at a predetermined time in the cycle to close the supervisory contacts when the starting contacts are closed, means operated by the bank controller after opening of the starting contacts to open the supervisory contacts only at a predetermined time in the cycle, and means for preventing opening of any previously closed flasher contacts before said predetermined time.

7. Paging apparatus comprising an annunciator having a plurality of signals, a plurality of banks of flasher switches, each bank including flasher contacts for the several annunciator signals, each signal being associated with corresponding contacts of the several banks, means for cyclically actuating the contacts of the several banks, manual means operable to render any switch effective at any part of the cycle, supervisory contacts for each bank to control the flow of current to the flasher contacts and to prevent, when open, the operation of any signal by a switch of the corresponding bank, a relay for the supervisory contacts, a bank controller for each bank operated by the cyclic actuating means therefor at the beginning of the cycle, connections between the bank controller and the relay to close the supervisory contacts, holding means to maintain the supervisory contacts closed, means for releasing the holding means, connections between the bank controller and the releasing means to permit operation of the latter only at a predetermined time in the cycle, and means for preventing opening of any previously closed flasher contacts before said predetermined time.

8. Paging apparatus comprising an annunciator having a plurality of signals, a plurality of banks of contactors, each bank having a plurality of contactors, one for each annunciator signal, connections from each signal to the corresponding contactors of the several banks, means for selectively pre-setting contactors of the several banks, a cam for each bank to close and open simultaneously all pre-set contactors of the bank, the several cams being displaced to operate on the several banks successively, supervisory contacts for each bank to control the flow of current to all contactors of the bank, a bank controller having a switch and a cam for momentarily closing the switch at a predetermined time in the cycle, an operating relay and a holding relay for the supervisory contacts, a manual start switch having a contact in series with the bank controller switch and the operating relay and a contact in series with the bank controller switch and the holding relay, and means for preventing opening of pre-set contactors except at approximately the time of opening the supervisory contacts, whereby the contactors can be rendered operative or inoperative only at a predetermined time in the cycle.

9. Paging apparatus comprising an annunciator having a plurality of signals, a plurality of banks of flasher switches, each signal being associated with corresponding switches of the several banks, selector means for individual flasher switches of each bank, operating means for actuating active flasher switches and acting successively on the several banks of flasher switches, whereby each bank controls display of annunciator signals for a portion only of each complete cycle, means for driving the operating means at either of two speeds, namely, a normal rate and a fast rate, and connections between the selector means and the driving means to operate at normal speed with respect to any bank when any selector is active and at the fast rate when no selector for the bank is active.

10. Paging apparatus comprising an annunciator having a plurality of signals, a plurality of banks of flasher switches, each signal being associated with corresponding switches of the several banks, selector means for individual flasher switches of each bank, operating means for actuating active flasher switches and acting successively on the several banks of flasher switches, whereby each bank controls display of annunciator signals for a portion only of each complete cycle, means for driving the operating means at either of two speeds, namely, a normal rate and a fast rate, a start switch for each bank, and a connection from the start switch to the driving means to operate at normal speed when the start switch is closed and at the fast rate when the start switch is open.

11. Paging apparatus comprising an annunciator having a plurality of signals, a plurality of signal circuits connected with each signal, the circuits being arranged in groups, each group having a circuit for each signal, circuit closing means comprising a cyclic control and a manual control, the cyclic control operating simultaneously on all of the circuits of any group and successively on the several groups whereby each group controls energization of signals for a portion only of each cycle, and the manual control selecting desired circuits in said groups, means for normally slowly operating the cyclic control, and means controlled by absence of manually selected circuits in any group for rapidly advancing the cyclic control with respect to said group.

12. Paging apparatus comprising an annunciator having a plurality of signals, a plurality of signal circuits connected with each signal, the circuits being arranged in groups, each group having a circuit for each signal, circuit closing means comprising a cyclic control and a manual control, the cyclic control operating simultaneously on all of the circuits of any group and successively on the several groups, and the manual control selecting desired circuits in said groups, a start switch for each group of circuits to render all circuits of the group inactive until the start switch is operated, and means for driving the cyclic control at a low or high speed with respect to any circuit group, depending on whether or not the start switch for that group is operated.

13. Paging apparatus comprising an annunciator having a plurality of signals, a plurality of signal circuits connected with each signal, the circuits being arranged in groups, each group having a circuit for each signal, circuit closing means comprising a cyclic control and a manual control, the cyclic control operating simultaneously on all of the circuits of any group and successively on the several groups, and the manual control selecting desired circuits in said groups at any part of the cycle, supervisory contacts for each group to control the flow of current thereto and to prevent, when open, energization of any circuit in the group, a controller to close the supervisory contacts only at a predetermined time in the cycle, holding means for maintaining the supervisory contacts closed after closure thereof by the controller, means for releasing the holding means to open the supervisory contacts only at a predetermined time in the cycle, and means for preventing de-energization of any previously energized circuit by operation of the manual control except at approximately the time of opening of the supervisory contacts.

VERNON DURBIN.